United States Patent [19]

Wenmaekers

[11] Patent Number: 4,839,093
[45] Date of Patent: Jun. 13, 1989

[54] PROCESS AND APPARATUS FOR CONTINUOUS MANUFACTURE OF AN EMULSION

[76] Inventor: Paul Wenmaekers, 2/4, Ave. Paul Déroulède, 75015 Paris, France

[21] Appl. No.: 828,832

[22] Filed: Feb. 12, 1986

[30] Foreign Application Priority Data

Feb. 15, 1985 [FR] France ................. 85 02241

[51] Int. Cl.⁴ ............... B01F 15/04; B01F 15/06; B01J 13/00
[52] U.S. Cl. ............ 252/314; 252/311; 252/312; 366/141; 366/145; 514/937; 514/938; 514/943
[58] Field of Search ............ 252/311, 312, 314; 366/141, 145; 514/937, 938, 943

[56] References Cited

U.S. PATENT DOCUMENTS

| | | | |
|---|---|---|---|
| 2,021,143 | 11/1935 | Calcott et al. | 252/314 X |
| 2,254,049 | 8/1941 | Schutte | 252/314 |
| 3,048,559 | 8/1962 | Heller et al. | 366/141 X |
| 3,635,834 | 1/1972 | Cilento et al. | 252/314 |
| 4,117,550 | 9/1978 | Folland et al. | 366/145 X |

FOREIGN PATENT DOCUMENTS

| | | |
|---|---|---|
| 0101007 | 2/1984 | European Pat. Off. . |
| 913218 | 6/1954 | Fed. Rep. of Germany . |
| 2357212 | 5/1975 | Fed. Rep. of Germany . |
| 2018092 | 4/1976 | Fed. Rep. of Germany . |
| 1414723 | 9/1965 | France . |
| 1486341 | 5/1967 | France . |
| 2112147 | 6/1972 | France . |
| 2471209 | 6/1981 | France . |
| 2489170 | 3/1982 | France . |
| WO84/03232 | 8/1984 | World Int. Prop. O. . |

*Primary Examiner*—Richard D. Lovering
*Attorney, Agent, or Firm*—Handal & Morofsky

[57] ABSTRACT

The invention relates to a process and apparatus for continuous manufacture of an emulsion.

A first liquid is brought to emulsion temperature and the components in suspension in the first liquid are brought to the state of second liquids able to be introduced into the first liquid. The components are brought in proportion in liquid form by means of a melting potdosimeter and maintained at the temperature of emulsion. The emulsion is carried out in an emulsion vat.

Application to the pharmaceutical, food and chemical industries.

15 Claims, 10 Drawing Sheets

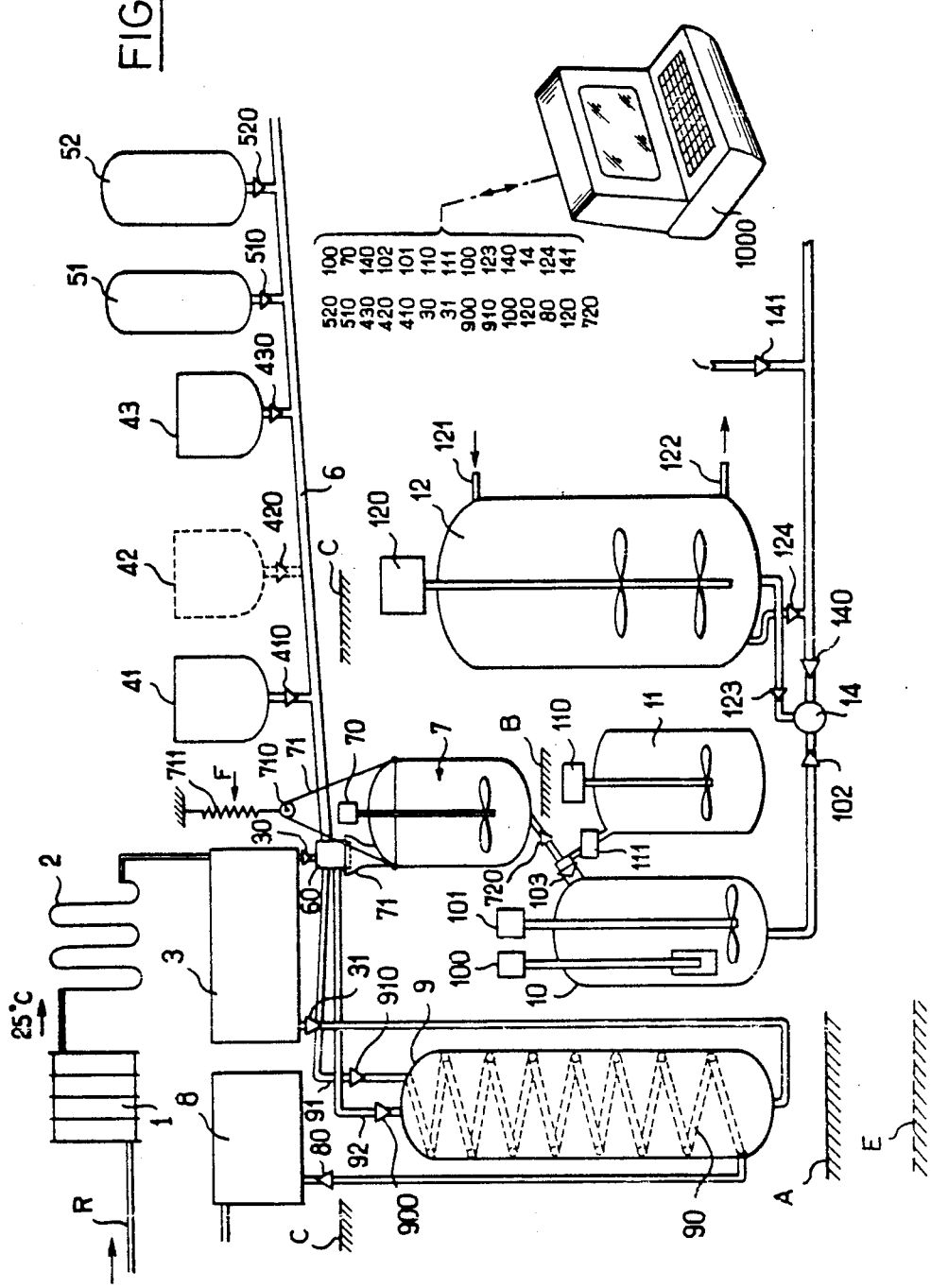

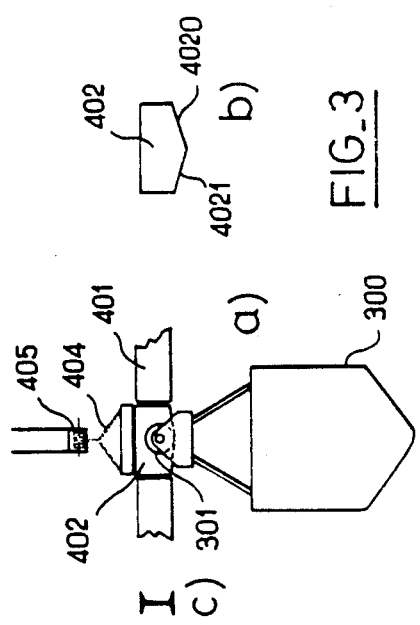
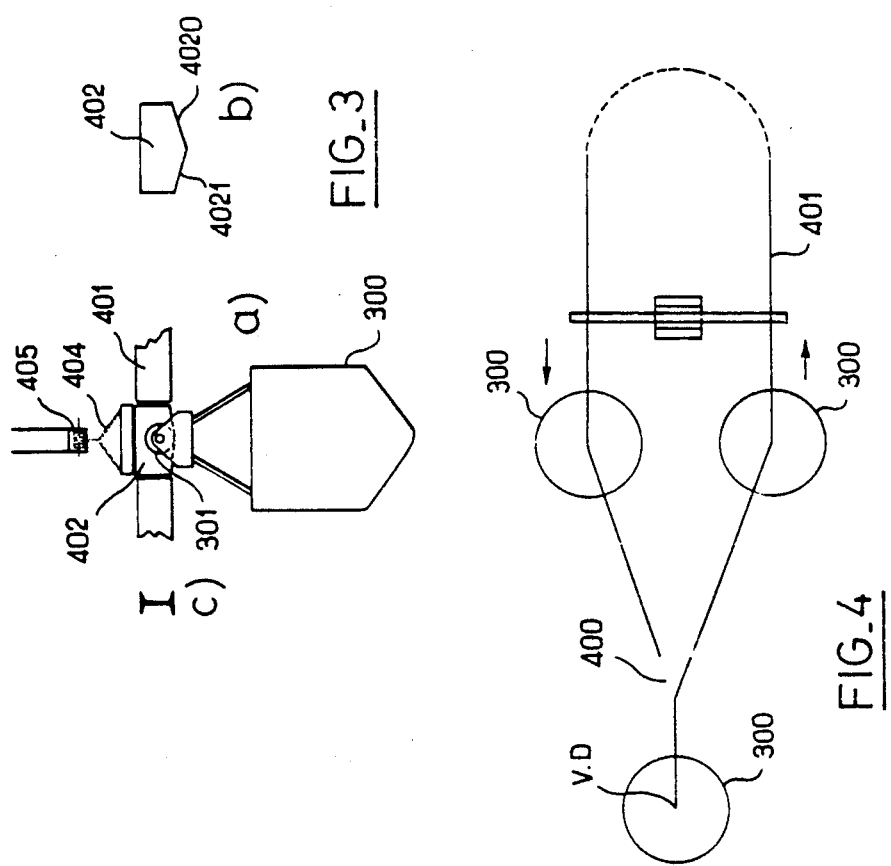
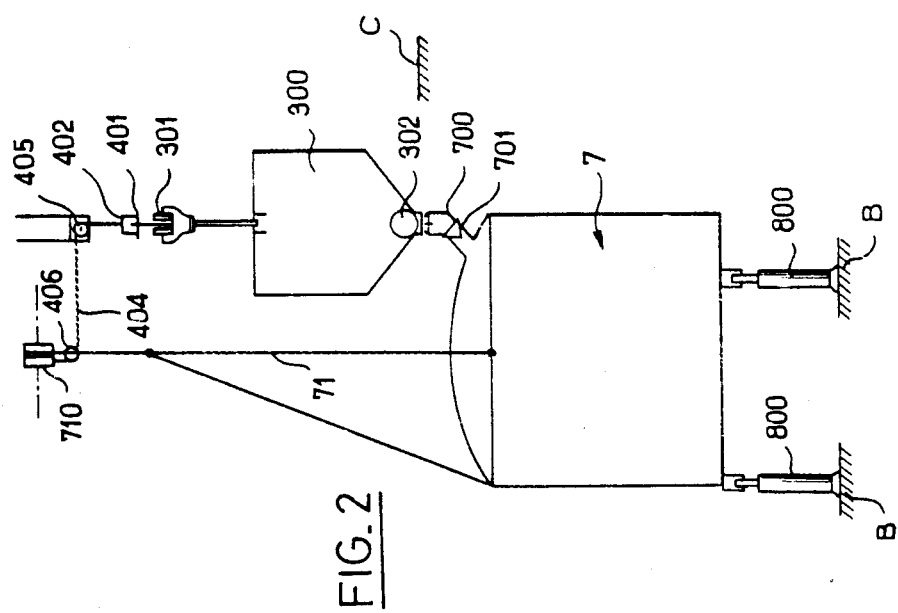

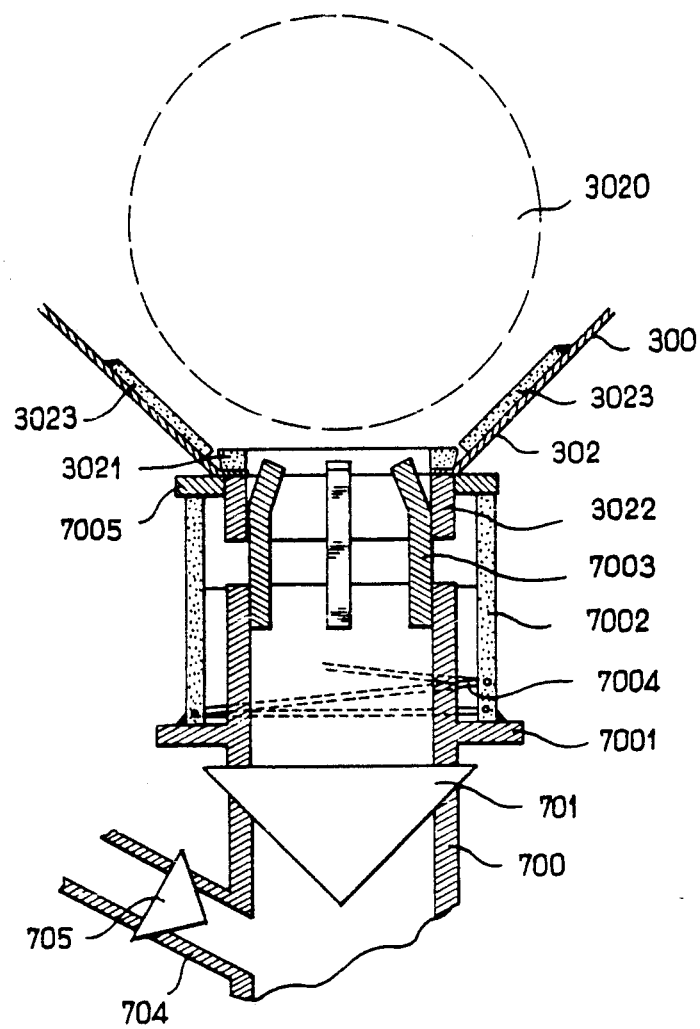
FIG_5

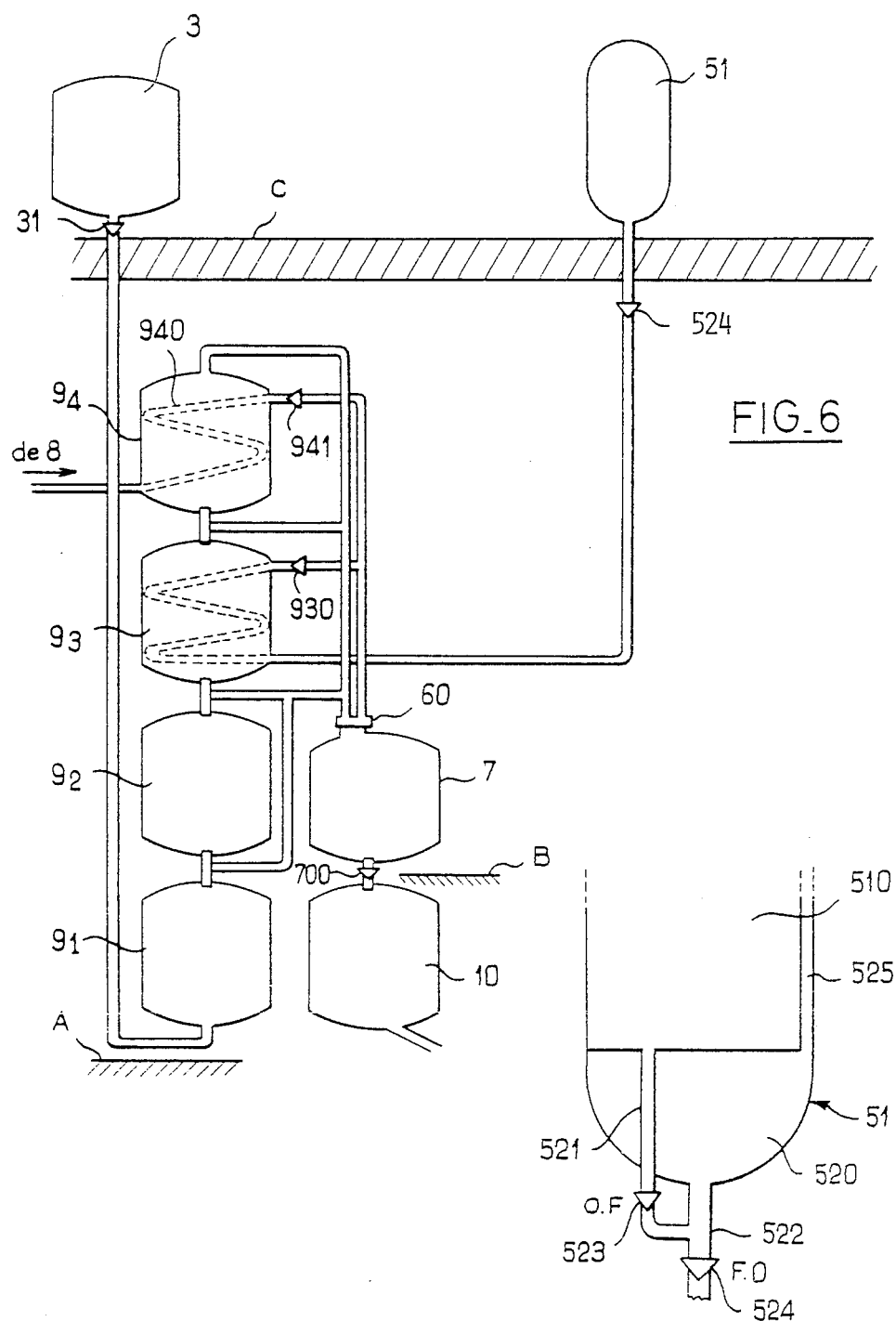
FIG_6

PROCESS AND APPARATUS FOR CONTINUOUS MANUFACTURE OF AN EMULSION

BACKGROUND OF THE INVENTION

The present invention relates to a process and to an apparatus for the continuous manufacture of an emulsion and to the emulsion thereby obtained.

At present, the preparation of emulsions on an industrial scale calls for numerous operations amongst which the proportioning of the different components of the emulsion is most often carried out in fixed amounts, the components being weighed before being raised to the temperature of emulsion, that is to say most often in the solid state, then transported and introduced into a melting or casting pot before being then introduced into an emulsifying vat to make the emulsion as such. The combination of these operations is long and costly because the operations of weighing in particular, are often carried out separately and cannot be introduced in a simple manner in an industrial process. In fact, the preparation of emulsion on an industrial scale can hardly in principle, even to this day, be differentiated from the extemporaneous preparation of pharmaceutical emulsions except by the quantity of components in question. For this reason, the emulsions presently prepared on an industrial scale are limited in quantity, which most often does not exceed in weight one ton per day.

to the inconveniences already mentioned, is added the inconvenience because of the relatively small quantity prepared per pouring, of a lack of homogeneity between the batches of product made. This lack takes on an extreme importance in the case of pharmaceutical emulsions for which the tolerances from one batch to another are particularly strict.

THE INVENTION

The present invention has the objective of remedying the mentioned inconveniences by providing a process and apparatus for continuous manufacture of an emulsion.

An object of the present invention is the provision of a process and apparatus for the continuous manufacture of an emulsion permitting a very distinctly improved yield with respect to existing techniques.

Another object of the present invention is the provision of a process and apparatus for the continuous manufacture of an emulsion permitting, on account of totally automated control, a great precision of measurement of the components and, from this, a great homogeneity of the different batches of product prepared due to an excellent reliability of the assembly.

Another object of the present invention is to provide a process and a device permitting the preparation of an end product of improved quality as a result of optimisation of the different operational phases.

The process of continuous manufacture according to the invention, of an emulsion comprising, in a first liquid, a plurality of components in suspension is distinguished in that it consists of bringing these components to the liquid state in a manner to constitute a plurality of second liquids able to be introduced in suspension into the first liquid. The components are introduced in proportion under liquid form into a melting pot-dosimeter and the contents of the melting pot-dosimeter are brought to the temperature of emulsion. A predetermined quantity of the first liquid is brought to the temperature of emulsion and the quantity of the first liquid and the contents of the melting pot-dosimeter are poured into an emulsion vat. The emulsion is then caused to emulsify in the vat by agitation.

The apparatus for continuous manufacture according to the invention, of an emulsion comprising in a first liquid a plurality of components in suspension is distinguished in that it has means for bringing the components to a liquid state in a manner to constitute a plurality of second liquids able to be introduced into suspension in the first liquid. Means permit the bringing of a predetermined quantity of first liquid to emulsion temperature and a melting pot-dosimeter permits receiving in proportion the first liquid and the components in the liquid form, the melting pot-dosimeter being capable of bringing its contents to the emulsion temperature. An emulsion vat is able to receive the contents of the melting pot-dosimeter and the quantity of first liquid. The emulsion vat permits, from appropriate means, the bringing about of the emulsion.

The invention finds application in an advantageous manner particularly in the pharmaceutical industry and the food and chemical industries.

BRIEF DESCRIPTION OF DRAWINGS

The invention will be better understood fom the following description and accompanying drawings, in which:

FIG. 1 shows a general diagram of a device able to put into operation the process of the invention, FIG. 2 shows a particularly advantageous embodiment of one of the elements of the apparatus shown in FIG. 1, FIG. 3 shows in 3a, 3b and 3c details of particular elements of the apparatus as shown in FIG. 1, FIGS. 4, 5 and 6 also show details of particular elements of the apparatus as shown in FIG. 1.

FIG. 7-1 is a flow sheet replacing originally filed Table I;

FIG. 7-2 is a flow sheet replacing originally filed Table II;

FIG. 7-3 and 7-4 together constitute a flow sheet replacing originally filed Table III;

FIG. 7-5 is a flow sheet replacing originally filed Table IV;

FIG. 7-6 is a flow sheet replacing originally filed Table V.

THE PREFERRED EMBODIMENT

Figures 1, 7:
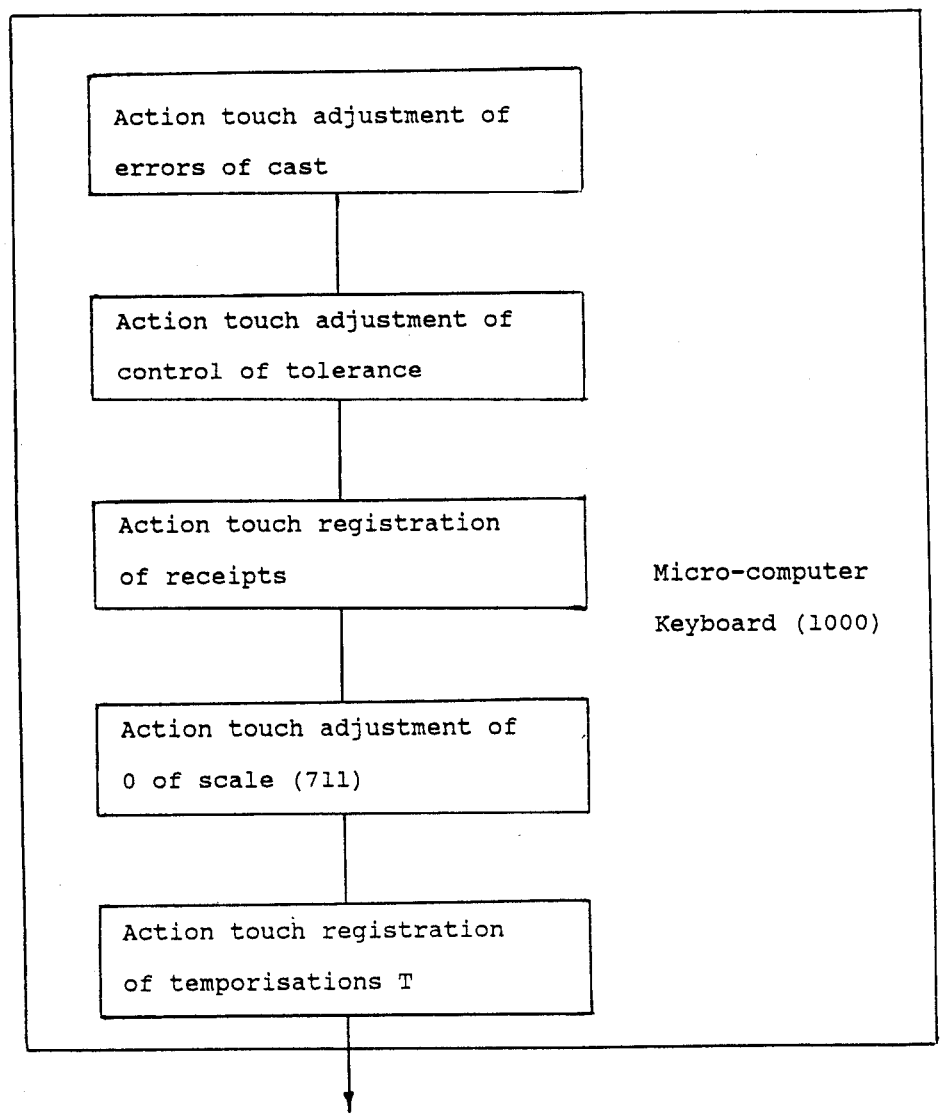

The method and apparatus of the invention will be described by way of non-limitative example in the case of the preparation or continuous manufacture of a pharmaceutical product having cosmetological and therapeutic properties and known under the registered trade mark "BIAFINE". This product is presented in the form of a complex in emulsion, which was the object of a detailed description in French Patent Specification No. 2 112 147 in the name of the applicant. The complex in emulsion as described comprises 5 to 20% of fatty acid, 1 to 30% of emulsifying agent, 2 to 40% of humectant, 0.1 to 5% of colloid protector and 0 to 60% of waxes and oils.

The process and apparatus of the invention will be described in the case where the waxes are constituted by glycol monostearate, 5/50 hard paraffin, cetyl palmitate and stearic acid. The oils can be comprised of liquid paraffin, an animal oil, perhydrosqualene, 1,2 propanediol and a vegetable oil, avocado oil. The colloid protector is preferably constituted by sodium alginate. Further, a base liquid, triethanolamine is utilised for giving the emulsion a final pH of 6.2. Other constituents can be added to the final composition such as for example liquid paraffins or antiseptics for example. The liquid in which the emulsion is carried out is constituted by demineralised water.

The process and the apparatus of the invention will be described in connection with FIG. 1.

According to the process of continuous manufacture of an emulsion of the present invention, the emulsion comprises in a first liquid constituted for example by demineralised water a plurality of components in suspension. As shown in FIG. 1, demineralised water is obtained from a heater 1 or a heat exchanger able to bring water from the mains R to a temperature of the order of 25° C. The water thus heated is then taken to a demineraliser 2 permitting the production of demineralised water by ion exchange via osmosis. The demineralised water has a resistivity of 1 Megohm/cm in accordance with the standards in force. The demineralised water thus obtained is held in a reservoir 3. The demineralised water is then brought to the temperature of emulsion particularly by means of a boiler 9, a control valve 31 permitting regulation of the feed of water to the boiler via the reservoir 3. In addition, the constituent components of the emulsion are brought to the liquid state in a manner to constitute a plurality of second liquids able to be introduced in suspension into the first liquid or demineralised water. For this, the components such as particularly the waxes and oils are introduced in proportion into a melting pot-dosimeter 7 in liquid form, the contents of the melting pot-dosimeter being brought to the emulsion temperature. In order to bring the components to the liquid state, the apparatus of the invention comprises a plurality of means constituted for example by wax melting pots 41,42,43 and by oil reservoirs designated 51,52 for example. Each of the wax melting pots 41,42,43 and the oil reservoirs 51,52 is connected to a duct designated 6 in FIG. 1, via the intermediary of a control valve 410,420,430,510,520. In FIG. 1, only a single duct is shown in order not to prejudice the clarity of the drawing. It should be noted that the apparatus of the invention can comprise in a nonlimitative manner a plurality of ducts 6, one per wax melting pot and/or oil reservoir, these ducts can be connected at a common collector 60. In FIG. 1, a limited number of wax melting pots and oil reservoirs has been shown intentionally. One melting pot or oil reservoir is preferably utilised for one of the components.

In FIG. 1, the melting pot-dosimeter 7 is shown in a schematic manner. Essentially it comprises a vat provided with agitation means 70 and an inlet nozzle 71 to which is connected the mentioned collector 60. In FIG. 1, the means for heating the wax melting pots 41,42,43 and the melting pot-dosimeter 7 is not shown in order not to prejudice the clarity of the assembly. A supplementary reservoir 8 contains paraffin oil. The oil reservoir is connected via the intermediary of a control valve 80 to a coil 90 of the boiler 9. The outlet from the coil 90 is connected via a valve 910 to the collector 60. The paraffin oil is thus heated before being led to the melting pot-dosimeter 7. The melting pot-dosimeter is shown in FIG. 1 suspended by fixing element 71 to a weighing system 711. The weighing element 711 is for example the traction lever of an electronic scale fixed to the fixing element 71 via the intermediary of a pulley 710. Further, the melting pot-dosimeter 7 is connected via a flexible duct and a valve 720 to an emulsion vat 10. The emulsion vat 10 is provided with agitation means 101 and temperature regulating means 100. The emulsion vat is itself connected via the intermediary of a valve 102 to a holding vat 12 for the final product. The holding vat 12 is a thermostatically controlled vat permitting the cooling of the emulsion obtained in appropriate conditions. The inlet 121 and the outlet 122 of the holding vat 12 represent the inlet and the outlet of a liquid for cooling the vat.

The first liquid or demineralised water passing through the boiler 9 is poured in predetermined quantity into the emulsion vat 10. The contents of the melting pot-dosimeter 7 is then also poured into the emulsion vat 10 and the emulsion is carried out with the aid of the agitation means 101. Further, in the case where the emulsion includes a protecting colloid, the device of the invention comprises a colloid reservoir 11 and means for loading and measuring of the colloid 111.

According to a non-limitative embodiment of the invention, the colloid loading and measuring means 111 are connected to an inlet valve 103 of the emulsion vat 10. The colloid loading and measuring means 111 can for example be constituted by a measuring pump with its flow rate electronically controlled and thus functioning as a dosimeter. In installations, trials were able to be carried out in a satisfactory manner by means of a pump distributed by the STOPPIL INDUSTRIE company, the pump being described in technical sheet No. 024 of this company.

Preferably, and according to an advantageous process of the invention, the introduction in proportion of all or part of the components into the melting pot-dosimeter is carried out by means of this latter. For example, the waxes are brought to melting state separately by means of wax melting pots 41,42,43, the oils are discharged via the reservoirs such as 51,52 without preheating or via the reservoir 8 after preheating by the boiler 9 successively into the melting pot-dosimeter 7. The melting pot-dosimeter 7 permits on each introduction of components in a liquid state, a precise determination of the mass of each component introduced into the melting pot-dosimeter and, in short, continuous or quasi continuous proportioning of the assembly of these components. In fact, the wax melting pots can be charged separately with solid product, each solid product being introduced into the corresponding bath of melted wax, the feed to the melting pot-dosimeter of melted wax and/or oil can then be carried out solely by control of the corresponding valves as a function of the necessary quantities. Thus, in a preferred manner, the introduction in proportion of the first liquid, demineralised water, and of the components, into the emulsion vat 10 is carried out via the intermediary of the melting pot-dosimeter 7. Utilisation of the melting pot-dosimeter for separate determination of the quantities of first liquid and/or components in proportion, permits continuous or quasi continuous production of emulsion, each pouring of emulsion being able to be held in the holding vat 12 or delivered for packaging via the intermediary of a switching distribution valve 14 and corresponding valves 140,123,124,141.

In FIG. 1, the lay-out of the assembly of the installation or a particularly advantageous apparatus of the invention has been shown. In this Figure, the installation is arranged with respect to at least three successive reference levels designated C,B,A, from the highest level to the lowest level. It should be noted that the assembly of reservoirs for demineralised water 3 and for liquid paraffin 8, oil reservoirs 51,52, wax melting vats 41,42,43 constituting in fact reservoirs of liquid wax, are arranged at a level higher than the highest level C. Similarly, the melting pot-dosimeter 7 is arranged at a level higher than the intermediary level B, but lower than the high level C. Finally, the emulsion vat 10, the inlet point of the coil 90 of the boiler 9 fed with paraffin oil, the inlet point of the boiler 9 itself fed with demineralised water via the reservoir 3, are situated at a level higher than the lowest level A, but itself lower than the intermediary level B. The outlet points of the coil 90 and of the boiler 9 respectively delivering the heated paraffin oil and the heated water, are substantially at the level of the inlet nozzle 71 of the melting pot-dosimeter 7 or of the collector 60, but necessarily at a level lower than the level of the reservoirs 3 and 8. Thus, the successive loading of the melting pot-dosimeter 7 with first liquid and then component, then the loading of the emulsion vat 10 is carried out by gravimetry. This solution has the advantage of permitting the avoidance of any loading pumps, which have inconveniences from the point of view of reliability of functioning and the precision of determination of the quantities introduced. In fact, the control of a pump cannot produce effects, from the point of view of instantaneous quantities of components and/or water moved, the precise determination of quantities appears critical.

Figures 2, 7:
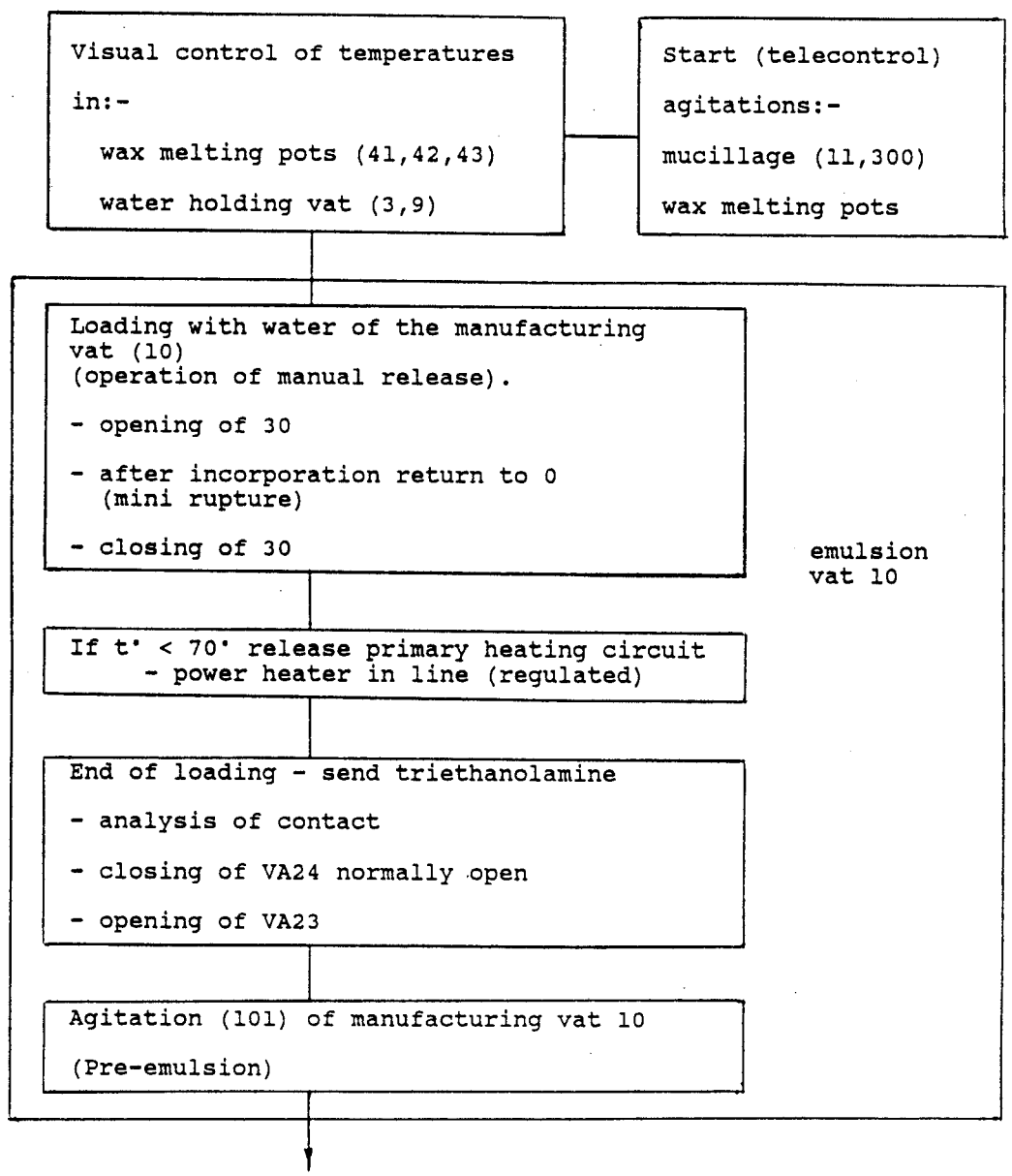
Figures 3, 7:
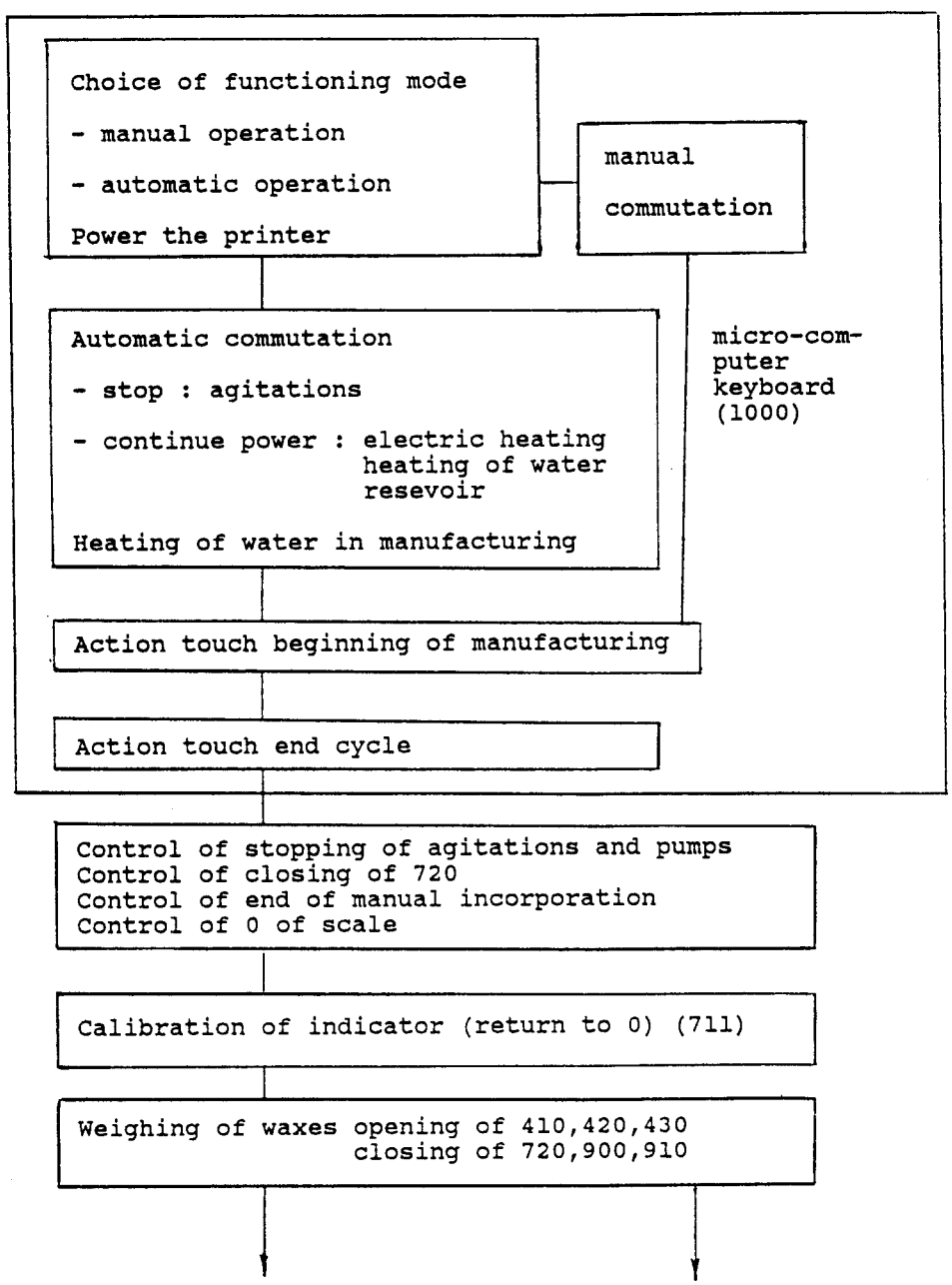
Figures 4, 7:
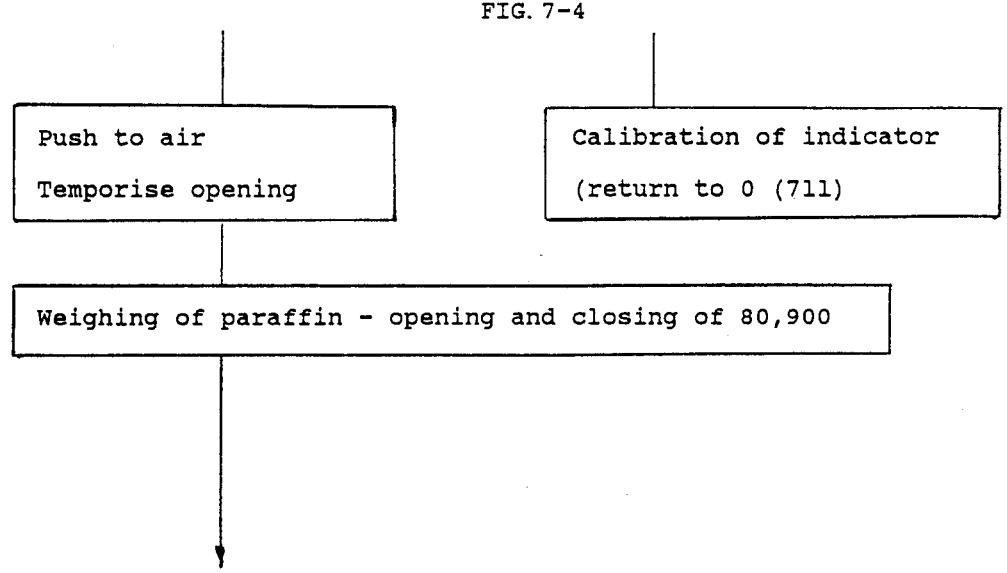

To this end, the colloid reservoir 11 can also be installed at a higher level than the level of the emulsion vat 10. Further, the colloid reservoir 11 can be constituted by a train of elemental skips 300 movable along a predetermined circuit 410 as shown in FIGS. 2,3 and 4.

Further, in the case where the emulsions manufactured are very fluid emulsions, the holding vat 12 can be placed at a fourth level E lower than the lowest level A. This arrangement has the advantage of avoiding a transfer pump between the emulsion vat 10 and the holding vat 12.

In accordance with the preferred embodiment of the Figures mentioned, the circulation circuit 401 of skips 300 is such that each skip circulates substantially at a level C above the level B of the melting pot-dosimeter 7. Each skip is able to deliver its contents to the melting pot-dosimeter. Thus the assembly of components of the emulsion as well as the colloid protector is introduced in proportion into the emulsion vat 10 via the intermediary of the melting pot-dosimeter 7. The proportioning of the assembly of constituents of the emulsion and of the first liquid is carried out by means of the melting pot-dosimeter. The assembly of the installation and of the process thus described is controlled by a micro-processor or micro-computer referenced 1000 in FIG. 1. Although the control connections for the assembly of valves and agitator means and/or temperature regulators have not been shown in this Figure, in order not to prejudice the clarity of the drawing, it will be understood that the control of each valve or mentioned means is achieved from a programme permitting the carrying out successively of the mentioned operations. The control valves used are valves of any type easily actuated by means of orders given by the micro-computer 1000 and by intermediary transducers if necessary. This type of circuit, within the reach of the man skilled in the art, will not be described.

A preferred embodiment will now be described with reference to FIGS. 2,3 and 4 already mentioned. The melting pot-dosimeter 7 is equiped with jacks 800 connected to the level B as already described. The skips 300 are circulated by means of the circuit 401 across the melting pot-dosimeter 7. Each skip is provided, as shown in FIG. 2, with an emptying nozzle 302 at its lower end. The melting pot-dosimeter 7 is provided with an inlet nozzle 700 having a control valve 701, the inlet nozzle being specially adapted to connect with the emptying nozzle 302 of each skip as will be described in a more detailed manner below. On passage of each skip over the melting pot-dosimeter 7, the displacement of the skips is stopped; the jacks equipping the melting pot-dosimeter 7 are actuated in a manner to cause, by displacement of the melting pot-dosimeter 7 towards the skip, the abutting of the emptying nozzle 302 of the skip and the inlet nozzle 700 of the melting pot-dosimeter. The connection being made, the inlet valve 701 is controlled for ensuring the continuous emptying of the skip into the melting pot-dosimeter. The jacks are then returned to rest, the melting pot-dosimeter being in a withdrawn position with respect the skip, this latter being then able to continue on its path. Preliminarily to the continuance on its path by the skip after emptying, the circuit 401 as shown in FIGS. 3a and 3b as a movable element 402 independent of the guide rail constituting the circuit 401. In FIG. 3c there is shown by way of example the section of the guide rail. The movable element 402 has with respect to the rail 401 a degree of freedom in the vertical direction only. The movable element is further connected by a suspension 404 and via the intermediary of pulleys 405,406 to the pulley 710 fixed to the weighing element (not shown). After emptying the skip 300 the partial return of the jacks 800 for disengaging the inlet nozzle 700 from the emptying nozzle 302 of the skip causes the automatic closing of this latter. The weighing element (not shown) already relieved of the weight of the melting pot-dosimeter 7 by the jacks being under the sole force of the empty skip 300 and its accessories, which constitutes a tare for the weighing element (not shown). The skip 300 can be filled by appropriate means not shown in FIG. 2, the dosage being effected by the weighing element 711 taking account of the tare. The skip 300 can then return to its path for another cycle, and the jacks 800 are returned to a totally withdrawn position for the further operation of the process. In order to ensure a good precision of measurement of the quantity of colloid protector, or other substances, introduced into the skip 300, the movable element 402 can have, as shown in FIG. 3, two concurrent inclined flats 4021,4020 capable of forming at their intersection a position of stable equilibrium for the displacement wheels 301 of the skip 300. It should be noted, that the position of stable equilibrium is chosen in alignment with the direction of transmission of forces from the suspension 404 as shown in FIG. 3a. The circuit 401 as shown in FIG. 4 can have at its end an emptying and measuring station designated VD, comprising a movable element 402, a set of points 400, a closed circuit comprising a plurality of skips 300, these being displaced on a corresponding circuit at the time of preparation of a pouring of emulsion between a loading measurement then an emptying at the emptying and measurement station VD.

Figures 5, 7:
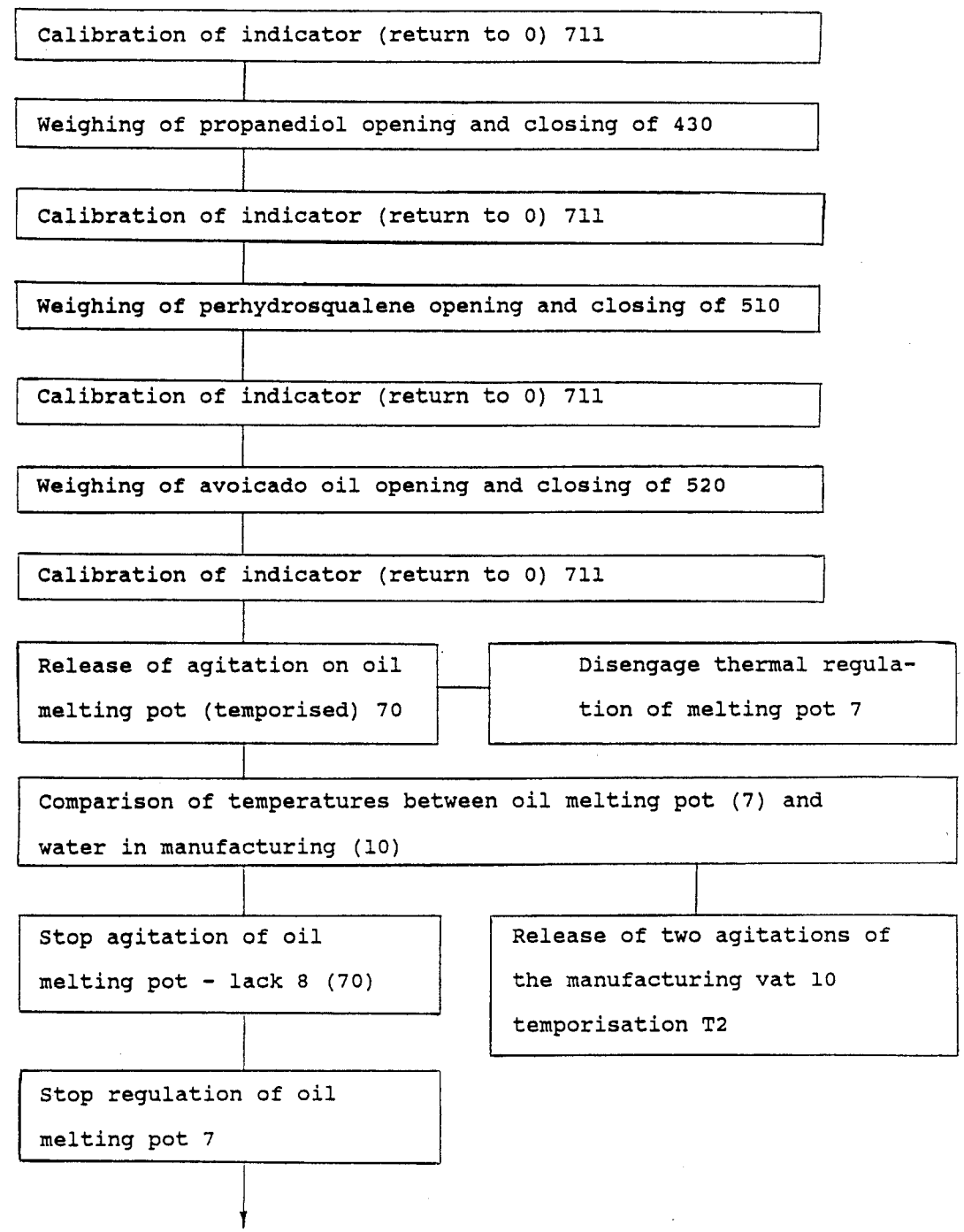

A particularly advantageous embodiment of the emptying nozzle 302 of each skip 300 and of the inlet nozzle 700 of the melting pot-dosimeter 7 will now be described by means of FIG. 5. The inlet nozzle 700 is in fact constituted by a tube having a shoulder 7001. The tube has in addition fingers or an index 7003 specially formed to permit their introduction into the opening neck 3022 of the emptying nozzle 302. A heavy sphere 3020 normally, that is to say in the absence of the mentioned fingers 7003, closes the neck 3022 of the emptying nozzle 302. The fluid tightness of the closing is ensured by strips of resilient material 3021 and 3023 arranged on the inside wall of the neck 3022 and on the inside wall of the emptying nozzle 302 in the form of a truncated cone. A sheath 7002 constituted by a wall or flexible cylindrical sleeve reinforced by a spring 7004 supports a guard ring 7005 and its supported on the shoulder 7001. The introduction of the fingers 7003 into the neck 3022 of the emptying nozzle, under the action of the jacks 800 has the effect of disengaging the heavy sphere 3020 and the continuous transfer from the skip 300 into the melting pot-dosimeter 7, the valve 701 having been preliminarily opened. In order to ensure a rapid transfer without loss of the contents of the skip 300, an intake 701 is in addition provided between the melting pot-dosimeter 7 and the valve 701. The inlet 704 is in addition provided with a valve 705. The inlet 704 and the valve 705 permit, the valve 701 being closed, the setting up of a relative vacuum in the melting pot-dosimeter.

On emptying, the preliminary existence of relative vacuum in the melting pot-dosimeter has the effect of a transfer practically without loss of the contents of the skip into the melting pot-dosimeter 7.

A VARIANT

Figures 6, 7:
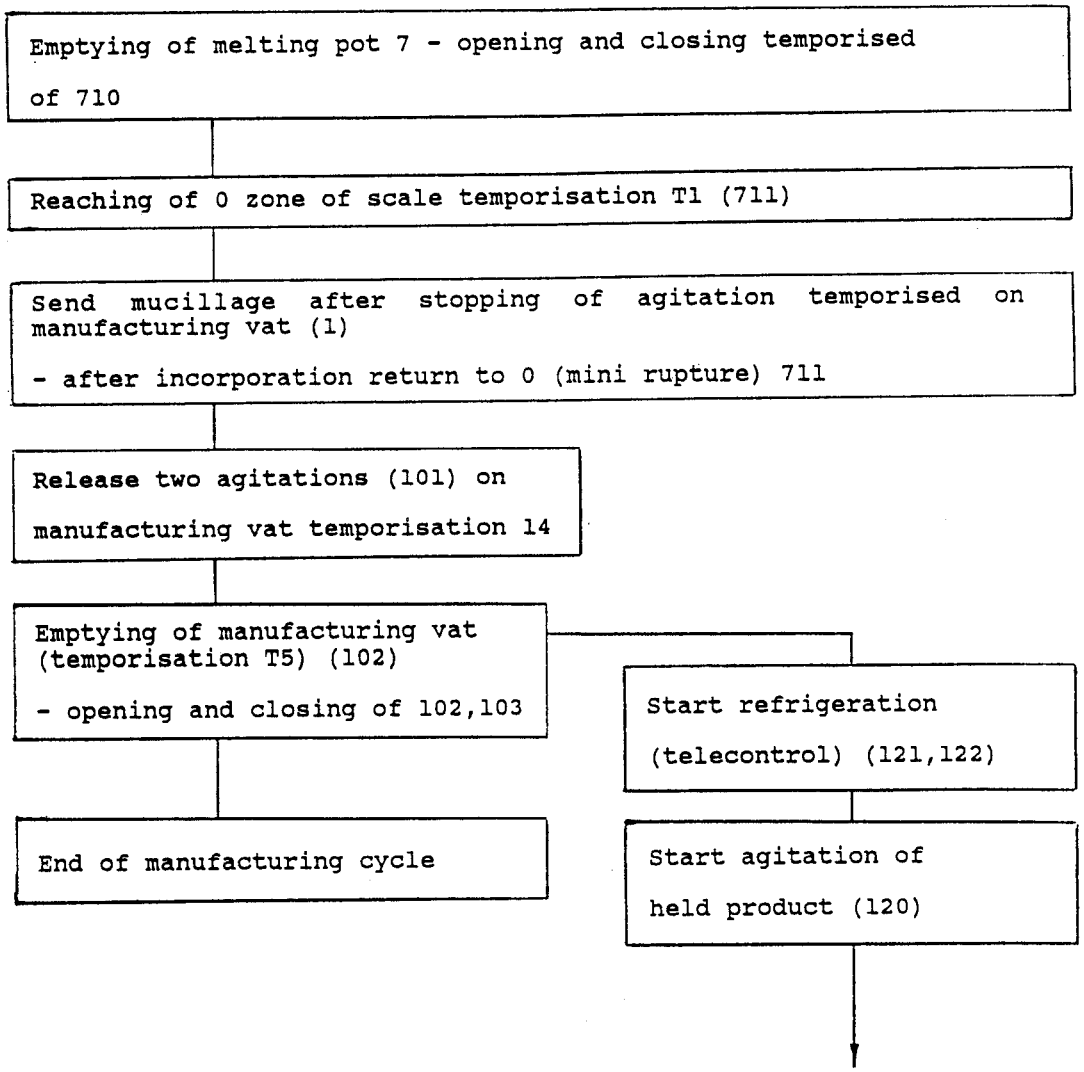

Another variant of the lay-out of the mentioned installation will now be described with reference to FIG. 6. In this Figure, the boiler 9 is, in an advantageous manner, subdivided into a plurality of elemental boilers 9 designated $9_1, 9_2, 9_3, 9_4$ superimposed one above the other between the levels A and C. This arrangement permits a successive emptying of each elemental boiler into the melting pot-dosimeter 7 and, in short, permits preserving, at the end of the operation, only a stock of demineralised water substantially equal to the volume of one of the elemental boilers. Further, the subdivision of the principal boiler into a plurality of elemental boilers $9_1$ to $9_4$ permits gradual heating of the demineralised water, each of the boilers taking the water to a temperature higher by a step to the final temperature obtained at the level of the last elemental boiler $9_4$. Thus as further appears in FIG. 6, this particular arrangement has the advantage of permitting a selective heating of the or each of the oils as a function of their temperature behaviour. Thus, each elemental boiler can for example be provided with a coil in which circulates one of the oils. By way of example, as shown in FIG. 6, paraffin oil, coming from the reservoir 8 is led into the coil 940 of the final elemental boiler $9_4$, through the control valve 941 which permits bringing of the demineralised water to its highest temperature. On the contrary, an oil such as avocado oil or perhydrosqualene oil which have a lower degree of resistance to elevation of temperature, can be led into an intermediary elemental boiler such as $9_3$ through the control valve 930 in which the demineralised water is fed at a lower temperature. In FIG. 6 two elemental boilers have been simply shown, and the connecting of their coils to the reservoir 8 containing the paraffin oil and to the reservoir 15 containing one of the mentioned oils. It should be noted, that this example is given in a non-limitative manner, any number of elemental boilers provided with coils naturally being able to be used.

OPERATION OF THE PREFERRED EMBODIMENT

Further indications will now be given in the case of preparation of the pharmaceutical emulsion "BIAFINE". In this case, the quantities of product in consideration for the preparation of a quantity of six tons of emulsion are given below. The operation of the process of the invention for preparation or manufacture of six tons of BIAFINE necessitates the treatment, by means of the installations described above, of 327 kg of glycol monostearate, 96 kg of hard paraffin, treated as wax, 21 kg of cetyl palmitate, 217.5 kg of stearic acid, these components normally being in solid state constituting waxes. Further, also to be treated in accordance with the process of the invention are 411 kg of liquid paraffin, 90 kg of perhydrosqualene, 138 kg of 1.2 propanediol and 60 kg of avocado oil constituting the oils. To the mentioned components must in addition be added 40.2 kg of triethanolamine constituting the base, in liquid form, 42.12 kg of sodium alginate, the colloid protector, 1.38 kg of methyl parahydroxy benzoate, 5.4 kg of propyl parahydroxy benzoate and 7.8 kg of perfume. The assembly of these components necessitates the use of 4320 kg of demineralised water, 3360 kg of water being introduced into the emulsion vat 10 and 960 kg of demineralised water being used for the preparation of the colloid protector or mucillage.

The demineralised water is brought by means of the vat 3 and of the boiler 9 or the assembly of elemental boilers to a temperature of 80° C. It should be understood that the temperature of 80° C. of the demineralised water is attained either in the upper part of the boiler 9 or in the upper elemental boiler $9_4$ shown in FIG. 6. It is evident that the continuous process of the invention does not bring in all the mentioned quantities of the components and the demineralised water in a single pouring. The process of the invention permits on the contrary the substantially identical repetition of successive pourings of much smaller quantities; the high degree of reliability of the assembly permitting the obtaining of a perfectly homogenous product by elemental pouring and in short a continuous or quasi continuous production. To this end, it is necessary to provide a production of demineralised water at 80° C. of 750 liters per hour. The vat 3 in consequence is provided with a capacity of 800 to 900 liters and the boiler 9 or assembly of elemental boilers have a capacity of 5000 liters. The water from the vat 3 is at a temperature of 25° C. after heating by the exchanger 1. In fact, of the 750 liters of demineralised water used per hour, 125 liters are utilised for the making of the mucillage. The preparation of the mucillage is carried out before the putting into operation of the production installation itself by introduction of the demineralised water in corresponding quantities, either into the skips 300 or mucillage vat 11, the sodium alginate then being introduced in proportion in the same elements, the assembly then being submitted to agitation for example by the means 110, in order to ensure the swelling of the sodium alginate. This preparation is normally carried out several hours before the production proper. The time required for swelling being of the order of substantially 12 hours. In fact, in the case where the device of the invention comprises skips 300, the displacement circuit 401 for the skips can advantageously be made in a manner to permit a cyclic displacement of the skips on the circuit, the cycle corresponding substantially to the time of preparation of the mucillage.

To this end, the loading of each skip being carried out in the conditions previously described at the emptying and measuring station VD, the skips are then displaced at suitable speed for returning to this same emptying station VD at the end of the cycle. The preparation of the mucillage being then started. It is now also necessary to start the preparation of the waxes to the liquid state. The waxes are melted at 80° C. by means of the mentioned melting pots 41,42,43. The different waxes, prepared from the solid state, are introduced into the corresponding wax bath in order to ensure a suitable level of loading of each wax melting pot. At the same time as the starting of the wax melting pots, the heating of the melting pot-dosimeter 7 is then carried out as well as the progressive heating of the emulsion vat 10. The melting pot-dosimeter 7 and the emulsion vat 10 having attained an equilibrium temperature of substantially 80° C., a first quantity of demineralised water is introduced into the vat 10 via the intermediary of the melting pot-dosimeter 7. It should be noted, that the measuring of the quantity of demineralised water introduced is carried out after preliminary weighing of the assembly of the melting pot-dosimeter 7 and the weighing element 711. Then the waxes are successively introduced into the melting pot-dosimeter 7, the measuring being carried out by means of this latter, after return to 0 of the tare after each introduction. In the same manner, the oils are introduced into the melting pot-dosimeter 7. It should be noted, that in the case where oils are introduced into the melting pot-dosimeter 7 do not have the temperature 80° C., a period of heating of the melting pot-dosimeter, that is to say of its contents, is provided in order to bring the assembly to the desired temperature of 80° C. It should be noted, that the contents of the melting pot-dosimeter 7 is then submitted to agitation with the aid of the means 70. Preferably, the triethanolamine is able to be introduced into the emulsion vat 10, in analogous conditions, that is to say by the intermediary of the melting pot-dosimeter 7, preliminary to the introduction of the waxes and oils into this latter. The contents of the melting pot-dosimeter 7 now containing the mixture wax plus oil at emulsion temperature, that is to say 80° C., is poured into the emulsion vat 10 by control of the valves such as 720 and 103. The contents of the emulsion vat 10 is, it will be noted, submitted to agitation by means of the agitation system 101 and the process of emulsion is then started. The introduction of mucillage can then be effected by means either of the mucillage vat 11 and measuring means 111, or, it should be noted, preferably, by means of skips 300, via the intermediary of the melting pot-dosimeter 7. It will be noted that the measuring of the mucillage having been preliminarily made during the loading of the skips, a second measuring can or cannot be made by means of the melting pot-dosimeter 7. The mucillage introduced into the emulsion bath contained in the vat 10 is then submitted to agitation in order to constitute the final emulsion. Approximately half an hour after the starting of the process of emulsion proper, the emulsion or elemental pouring of the emulsion is ended and the contents of the emulsion vat 10 is sent via the intermediary of a distribution valve-pump system 14, into the holding vat 12, in which a process of cooling is started, the emulsion being submitted to an intermittent agitation with the aid of means 120. The holding vat 12 is connected to an outlet duct permitting delivering of the final product for holding in bulk or for packaging. Further, a duct and a valve 124 permit total emptying of this. The holding vat 12 is a thermostatically controlled vat of the type having a double wall in which a closed circuit for water at 3° C. is provided for ensuring the cooling of the final product, introduced at a temperature of substantially 80° C. to the temperature of approximately 18° C.

It should be noted, that the assembly of mentioned operations is controlled by the processor or micro-computer 1000. This, advantageously, permits the operation of the process of the invention in a totally automated manner by means of the mentioned installation. The micro-computer is provided with a program for operating the process, that is to say in fact an operating program with different stages of the mentioned process and of management of the assembly of installations previously described. This program is a program of the "menu" type permitting an operator, on corresponding instigation written in the program, to define all the parametres of operation of the manufacturing cycle as well as all the relative parametres of the desired composition of final product obtained. To this end, by way of non-limitative example, the program contained in the internal memories of the micro-computer 1000 has different sub-programs permitting particularly registration of the receipt of the final product, that is to say in fact the composition in weight of the assembly of constituents of the emulsion comprising the demineralised water which will have been passed through the melting pot-dosimeter 7. The operator has to this end, only to modify the values of corresponding parametres introduced on the keyboard of the micro-computer. These sub-programs such as the effective consumption of each of the components equally provided, which then permit to give the operator any information concerning the necessary reloading of each wax melting pot or reservoir of oil concerned in order to ensure suitable maintenance of loading of the installation. Further a subprogram for errors of cast permits taking account, in the measuring of products or components, of variations of flow of feed of the melting pot-dosimeter 7 as a result of variation of charge of the reservoirs constituted by the wax melting pots or by the oil reservoirs and equally uncertainties of the quantity effectively introduced into the melting pot-dosimeter 7 as a result of inertia of control of each of the valves of the installation. Further, a program or subprogram for registering values of tolerance in the composition of the final product can be provided, in order to ensure a permanent control by the operator or if necessary by the pharmacist. The control of the valves of the assemly of the apparatus, of the agitation means, of the heating means or the temperature regulation means is ensured by means of parameters known as temporisation defined by the operator by the introduction of corresponding values $T_i$ to the keyboard of the micro-computer if necessary. Further, a program or sub-program for validation of the calibration of the weighing element 711 is in addition provided in a manner to take account, in the course of a process, of the different introductions of components into the melting pot-dosimeter 7 and in that to permit precise measuring of the components successively added into the latter. A flow diagram of the essential operations carried out in the course of operating the process of the invention by means of the previously described installation will be given in the following tables joined to the present description.

Experience has shown that the melting pot-dosimeter is very precise, particularly when the level of feed reservoirs is maintained substantially constant. On the contrary, if one utilises successively six times one hundred liters from a reservoir of seven to eight hundred liters, the errors of cast can vary between +10% and −10% between the first and the last weighing.

A FURTHER VARIANT

In order to obtain substantially constant levels of load of the melting pot-dosimeter, without having to reload the reservoirs after each weighing, the reservoirs, such as the reservoir 51 as shown in FIG. 6, can be constituted by a reservoir with two separate chambers 510,520. The two mentioned chambers are in communication by a duct 521 which for example opens into the outlet duct 522 of the reservoir 51. The duct 525 of small to very small cross-section puts into communication the second chamber 520 with the surrounding medium. The duct 525 can advantageously be placed inside the first chamber, substantially in a manner to open to the outside of the reservoir 51. The ducts 521 and 522 are respectively provided with an electric control valve 523, 524, the valve 524 being situated downstream of the opening of the duct 521 into the duct 522. The electric valves 523,524 controlled in opposite phase O.C, C.O., the one being open and the other being closed, and reciprocally, permit the filling of the chamber 520 from the chamber 510, the electric valve 524 being closed, then the loading of the melting pot-dosimeter by the opening of the valve 524, the valve 523 being closed in these conditions substantially analogous to the discharge for each utilisation thanks to the constant volume of the chamber 520 and the small relative volume of the duct 525. The chamber 520 can without inconvenience be slightly greater than the quantity to be weighed since the provision of measuring is ensured by the single melting pot-dosimeter.

It is possible to increase the volume of the chamber 520 if the partition separating the two chambers can be made removable.

The process of the invention is particularly remarkable in that it permits the manufacture of emulsions having a great degree of finesse and homogeneity with respect to emulsions obtained up till now by means of traditional processes. One may state, in effect, that the emulsion prepared by means of the process of the invention has a great degree of finesse, when emulsions prepared from the same components according to the prior processes cannot pretend to have such a degree of finesse over large quantities. On account of, on the one hand this great degree of finesse of end product and, on the other hand of the great constancy in the homogeneity of this product, it further appears that particularly in the case of medicaments such as BIAFINE, the method of application and in short the therapeutic effect can be optimised and thus improved as a function of each of the applications.

I claim:

1. A process for the continuous manufacture of an emulsion comprising, in a first liquid, a plurality of components in suspension, said process consisting in:
    bringing said components to the liquid state in a manner to constitute a plurality of second liquids able to be introduced in suspension into said first liquid,
    introducing in mass proportion into a melting pot-dosimeter all or part of said components in liquid form and bringing the contents of said melting pot-dosimeter to the temperature of emulsion,
    bringing a predetermined quantity of said first liquid to the temperature of emulsion,
    pouring of said quantity of said first liquid and said contents of said melting pot-dosimeter into an emulsion vat, and
    causing emulsion in said emulsion vat by agitation.

2. A process according to claim 1, wherein said introduction in proportion of part of said components into said melting pot-dosimeter is carried out by means of the latter.

3. A process according to claim 1, wherein the said components comprise waxes, said waxes being brought to the melted state separately and introduced successively into said melting pot-dosimeter.

4. A process according to claim 1, wherein said components comprise oils, each of which is introduced successively into said melting pot-dosimeter.

5. A process according to claim 1, wherein said components comprise a colloid, which is introduced into said melting pot-dosimeter.

6. A process according to claim 1, wherein preliminarily to said introduction of said first liquid into said emulsion vat, it is brought into said melting pot-dosimeter in a manner to determine the quantity of said first liquid.

7. Apparatus for continuous manufacture of an emulsion, containing in a first liquid a plurality of components in suspension, said apparatus comprising:
    means for bringing said components to the liquid state in order to constitute a plurality of second liquids able to be introduced in suspension into said first liquid,
    means permitting bringing of a predetermined quantity of said first liquid to the temperature of emulsion,
    a melting pot-dosimeter adapted to receive in mass proportions said components in liquid form and said first liquid, said melting pot-dosimeter being in addition capable of bringing its contents to the temperature of emulsion, and
    an emulsion vat adapted to receive said quantity of said first liquid and said contents of said melting pot-dosimeter, said emulsion vat being provided with means for causing emulsion.

8. Apparatus according to claim 7, wherein said apparatus comprises in addition a colloid reservoir and means for loading and measuring colloid in order to introduce into the emulsion a colloidal substance or a colloid.

9. Apparatus according to claim 7, wherein said colloid reservoir and said means for loading and measuring colloid are adapted for loading of said colloid into said emulsion vat or into said melting pot-dosimeter.

10. Apparatus according to claim 7, wherein said apparatus is adapted for said components and said first liquid to be introduced into said emulsion vat via the intermediary of said melting pot-dosimeter for introduction in proportion of said components and said first liquid.

11. Apparatus according to claim 7, wherein the layout of said apparatus is arranged with respect to at least three successive reference levels, whereby the successive charging of said melting pot-dosimeter with said components and with said first liquid, then of said emulsion vat is carried out by gravimetry.

12. Apparatus according to claim 11, wherein said colloid reservoir is constituted by a train of elemental skips and said apparatus includes a predetermined circuit for displacement of said skips, said circuit having at least one emptying and measuring station, each said skip circulating at one of said three levels higher than another of said three levels at which said melting pot-dosimeter is positioned and each said skip being adapted to deliver its contents into said melting pot-dosimeter.

13. Apparatus according to claim 7, including a microprocessor or micro-computer for operating the assembly of said apparatus.

14. Apparatus according to claim 7, wherein said melting pot-dosimeter is adapted for, on each introduction of said components in liquid form, a precise determination of the mass of each component introduced into it.

15. Apparatus according to claim 7, wherein said means for bringing said components to the liquid state comprises a reservoir for each said component to be brought to liquid state, each said reservoir comprising:
two separate chambers,
a duct putting said two chambers in communication,
an outlet duct from said reservoir,
electric valves in said duct between said two chambers and in said outlet duct respectively for enabling the filling of one of said chambers after loading of said melting pot-dosimeter in substantially analogous flow conditions for each utilisation, whereby substantially constant levels of load of said melting pot-dosimeter are obtained.

* * * * *